US012088236B2

United States Patent
Sepúlveda Gonzalez et al.

(10) Patent No.: US 12,088,236 B2
(45) Date of Patent: Sep. 10, 2024

(54) CONTROL OF AN INDUCTION GENERATOR OF A WIND TURBINE

(71) Applicant: Siemens Gamesa Renewable Energy Innovation & Technology S.L., Sarriguren (ES)

(72) Inventors: Miguel Ángel Sepúlveda Gonzalez, Madrid (ES); Mikel Tapia Pascal, Navarra (ES)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 29 days.

(21) Appl. No.: 17/800,586

(22) PCT Filed: Feb. 25, 2021

(86) PCT No.: PCT/EP2021/054731
§ 371 (c)(1),
(2) Date: Aug. 18, 2022

(87) PCT Pub. No.: WO2021/170743
PCT Pub. Date: Sep. 2, 2021

(65) Prior Publication Data
US 2023/0079096 A1 Mar. 16, 2023

(30) Foreign Application Priority Data
Feb. 26, 2020 (EP) .................................... 20380010

(51) Int. Cl.
*H02P 9/10* (2006.01)
*H02P 23/08* (2006.01)

(52) U.S. Cl.
CPC .............. *H02P 9/107* (2013.01); *H02P 23/08* (2013.01)

(58) Field of Classification Search
CPC .......... H02P 9/107; H02P 23/08; H02P 9/007; F03D 7/0284; F05B 2270/337
See application file for complete search history.

(56) References Cited

U.S. PATENT DOCUMENTS

| | | | | |
|---|---|---|---|---|
| 6,392,371 B1* | 5/2002 | Cheng | ..................... | H02K 19/26 318/158 |
| 9,581,138 B2* | 2/2017 | Wakasa | .................... | F03D 9/255 |
| 9,874,107 B2* | 1/2018 | Falb | ........................ | F03D 7/042 |
| 10,760,547 B2* | 9/2020 | Howard | .................. | F03D 7/022 |
| 10,797,486 B2* | 10/2020 | Wagoner | ................ | H02P 9/007 |
| 2007/0121354 A1* | 5/2007 | Jones | .................. | H02M 5/4585 363/67 |

(Continued)

OTHER PUBLICATIONS

International Search Report & Written Opinion for PCT/EP2021/054731, mailed on Jun. 8, 2021.

(Continued)

*Primary Examiner* — Pedro J Cuevas
(74) *Attorney, Agent, or Firm* — Schmeiser, Olsen & Watts LLP

(57) ABSTRACT

A method of controlling an induction generator is provided connected to a utility grid, the method including: receiving an actual grid frequency; and controlling rotor windings of the generator by a rotor control signal having a rotor winding reference frequency being set in dependence of the actual grid frequency.

13 Claims, 1 Drawing Sheet

(56) References Cited

U.S. PATENT DOCUMENTS

| | | |
|---|---|---|
| 2009/0160187 A1* | 6/2009 | Scholte-Wassink ........................ F03D 7/0284 290/55 |
| 2010/0246228 A1* | 9/2010 | Kazlauskas ......... H02M 7/1626 363/127 |
| 2011/0037262 A1 | 2/2011 | Krueger |
| 2011/0101689 A1* | 5/2011 | Larsen .................... H02M 1/12 363/39 |
| 2019/0214927 A1 | 7/2019 | Letas |
| 2019/0238077 A1* | 8/2019 | Azar ....................... H02P 9/107 |
| 2020/0191116 A1* | 6/2020 | Howard .................. H02P 21/22 |
| 2020/0195012 A1* | 6/2020 | Wagoner ................. H02P 9/007 |
| 2022/0069751 A1* | 3/2022 | Zhu .......................... H02P 21/00 |
| 2022/0316444 A1* | 10/2022 | Esbensen .............. F03D 7/0284 |
| 2023/0049606 A1* | 2/2023 | Lwin .................... F03D 7/0276 |

OTHER PUBLICATIONS

Feltes C et al: "Variable Frequency Operation of DFIG based Wind Farms connected to the Grid through VSC-HVDC Link", Power Engineering Society General Meeting, 2007. IEEE, IEEE, PI, Jun. 1, 2007 (Jun. 1, 2007). pp. 1-7.

Dongyang Sun, et al.; "Research on frequency inertia response control strategy of SCESS-DFIG system considering variable wind speed"; The Journal of Engineering; pp. 2995-3001, vol. 2019; 2019.

* cited by examiner

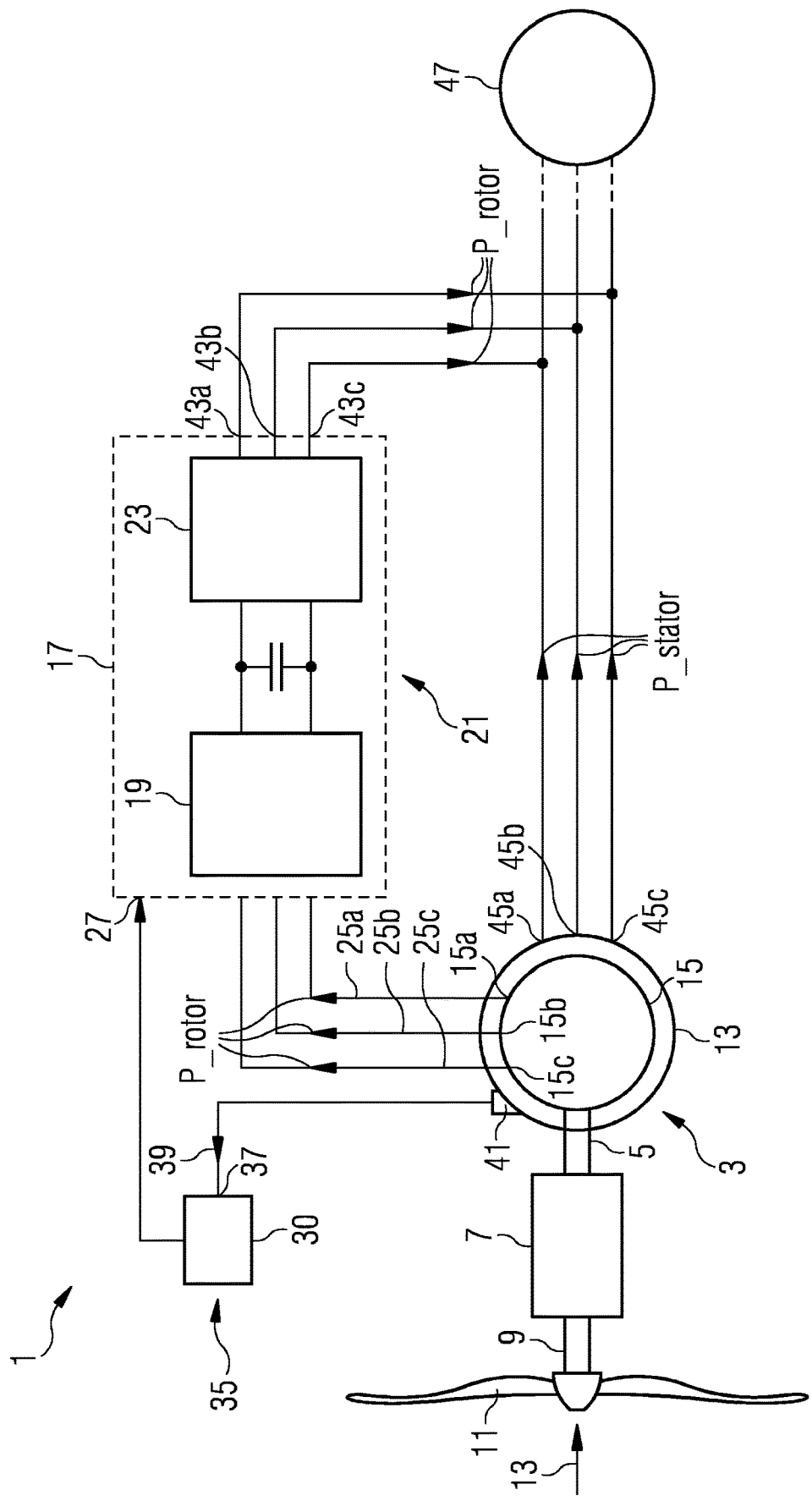

CONTROL OF AN INDUCTION GENERATOR OF A WIND TURBINE

CROSS-REFERENCE TO RELATED APPLICATIONS

This application claims priority to PCT Application No. PCT/EP2021/054731, having a filing date of Feb. 25, 2021, which claims priority to EP Application No. 20380010.7, having a filing date of Feb. 26, 2020, the entire contents both of which are hereby incorporated by reference.

FIELD OF TECHNOLOGY

The following relates to a method and to an arrangement of controlling an induction generator connected to a utility grid, in particular during changing grid frequency. Furthermore, the following relates to a wind turbine including an induction generator and the arrangement.

BACKGROUND

Wind turbines are connected to an electrical utility grid which operates at a particular nominal frequency, such as 50 Hz or 60 Hz. The actual frequency of a utility grid may however, due to imbalance of production of power and consumption of power, deviate from the nominal grid frequency. Grid operators are developing hard normative trying to secure the grid stability. According to particular grid connection normatives, wind turbines may be required to remain connected to the grid, even if the actual grid frequency deviates in a particular grid frequency range, such as 6-8% from the nominal grid frequency. Furthermore, wind turbines may be required to perform other control functions when the actual frequency deviates from the nominal grid frequency.

Deviations of the frequency from the nominal grid frequency may however affect the operation of components of the wind turbine, such as generators and/or converters included in the wind turbine. In particular, induction generators may be affected regarding operation in case of frequency changes. Conventionally, induction generators and/or converters connected to the induction generator, may have been over-specified or over-dimensioned in order to allow operation over a particular grid frequency range around a nominal grid frequency. By over-dimensioning the components (for example regarding rated power, rated current or rated voltage) these components were able to be operated at differing frequencies. However, thereby heavier equipment and more expensive equipment was required according to the conventional art. Conventionally, requirement envelopes have been calculated to define ratings of the components for a particular frequency range of expected variations from the nominal grid frequency.

Thereby, the conventionally applied methods and systems require a complex heavy equipment and heavy associated high costs.

Furthermore, conventionally, it has been observed that some components may be overloaded during particular frequency events, for example involving risk of overheating, impact on wind turbine availability or even damage in components in case of particular frequency events.

Thus, there may be a need for a method and for an arrangement of controlling an induction generator connected to a utility grid, wherein over-dimensioning may be mitigated or even avoided and wherein heavy equipment or costly equipment is not necessary.

SUMMARY

An aspect relates to a method of controlling an induction generator connected to a utility grid, the method comprising: receiving an actual grid frequency; and controlling (e.g. field) rotor windings of the generator by a rotor control signal having a rotor winding reference frequency (e.g. $\Omega\_ref$) being set in dependence of the actual grid frequency (e.g. f).

The method may for example be performed by a controller of the induction generator which may for example be a portion of a wind turbine controller. The method may be implemented in software and/or hardware.

An induction generator is an asynchronous generator which generates alternating current when its rotor shaft is rotating relative to stator windings. The rotor needs to rotate faster than the synchronous speed in order to output rotor power having the desired frequency. The so-called synchronous speed corresponds to the frequency of the AC power to be provided to the utility grid. In order to operate the induction generator, excitation signals or excitation power (also referred to as control signals) needs to be supplied to the rotor winding. The relative difference between synchronous speed and the operating speed is called the slip usually expressed as percent of the synchronous speed. When used in a wind turbine for example a secondary shaft of the wind turbine, coupled via a gear box to a main shaft of the turbine at which plural rotor blades are connected, drives the rotor of the induction generator to be spinning higher than the synchronous speed. Power is generated in the stator windings as well as in the rotor windings.

The induction generator may be implemented in different manner. One example of an induction generator is a doubly-fed electric machine. The doubly-fed electrical machine has two sets of windings (for example three-phase-windings), one stationary (i.e., the stator windings) and one rotating (i.e., the rotor winding). The stator windings may be directly connected to the output terminal of the generator. The rotor windings (which are traditionally also called the field windings) may be connected to a converter providing an AC-power at a variable frequency which may be adjusted as required.

In particular, the AC-frequency of the converter connected to the rotor winding may be set according to the rotor winding reference frequency. This rotor winding reference frequency is set based on and changing with the actual grid frequency.

The converter may be connected between the rotor windings and the output of the stator windings to convert AC to DC and DC to AC. The converter may be bidirectional and thereby may be enabled to pass power in both directions. Thus, the converter may be utilized to actually supply the control signal (or excitation signal) to the rotor winding but at the same time or simultaneously, also receive the rotor power from the rotor winding, convert it to the desired grid frequency and output this rotor power to the utility grid. Since the output of the converter may be connected to the output of the stator windings, also, additionally to the rotor power, the stator power as output by the stator winding may be supplied to the utility grid.

The doubly-fed induction generator may comprise a multi-phase wound rotor and a multi-phase slip ring assembly with brushes for access to the rotor windings. According to embodiments, it is possible to avoid the multi-phase slip ring assembly, but there may be problems with efficiency, cost and size. According to other embodiments, a brushless wound rotor doubly-fed electrical machine may be utilized as the induction generator. Thereby, the stator windings may be connected to the utility grid and the rotor windings may be connected to a converter via slip ring and back-to-back voltage source converter which may control both, the rotor and the grid currents. Thereby, it may be enabled to freely set the rotor frequency to be the rotor winding reference frequency which changes with the actual grid frequency. Furthermore, by using the converter to control the rotor current, it is possible to adjust the active and the reactive power fed to the utility grid from the stator independently of the generator's rotational speed. The control principle applied may for example involve two axis vector control or direct torque control.

The momentaneous grid frequency may be measured involving sampling and/or averaging and/or filtering to obtain the actual grid frequency. For controlling the rotor windings, a converter may be utilized which is connected to the rotor windings on one end and is also connected to the output of the stator windings at another end. When the rotor winding reference frequency of the control signal controlling the rotor winding is set in dependence of the actual grid frequency, the operation of the induction generator may be improved and in particular overloading or overheating of components may be avoided. In particular, the loading of the rotor and/or the stator winding may substantially not change upon change of the actual grid frequency. Thus, oversizing the rotor and/or the stator winding and/or the converter may be avoided.

The change of the grid frequency may cause a modification of the synchronous speed of the induction generator which modifies the nominal operation. By changing or adapting the rotor winding reference frequency in accordance with the changed grid frequency, over-specifying or over-dimensioning the electrical component for supporting such event may be avoided or may not be required any more. Thus, over-costs of components due to over-specification, mainly induction generator (for example squirrel cage-type and DFIG-type) and the partial load converter may be mitigated. Furthermore, wind turbine power deratings due to overheating of components, which are not over-dimensioned may be mitigated during frequency events of the utility grid. Thereby, wind turbine availability may be guaranteed to a higher degree. In particular, the wind turbines may stay connected to the utility grid as demanded by grid regularities.

According to an embodiment of the present invention, the internal control generator speed reference (above referred to as rotor winding reference frequency) may be set as a function of the grid frequency deviation, i.e., a deviation between the nominal grid frequency and the actual grid frequency. The method may be applicable only in rated condition, that is where design limit can be reached.

According to an embodiment of the present invention, the utility grid is designed to be operated with a nominal grid frequency, wherein the rotor winding reference frequency (e.g., $\Omega\_ref$) is set in dependence of a deviation between the actual grid frequency (e.g., f) and the nominal grid frequency (e.g. f0).

The nominal grid frequency may for example amount to 50 Hz in Europe or 60 Hz for example in the United States of America. When the rotor winding reference frequency is set in dependence of the deviation between the actual grid frequency and the nominal grid frequency, the method may still be simplified while it may be ensured that the actual loading or actual power of the rotor windings and/or the stator winding and/or the converter is substantially not changed in case of grid frequency changes. In particular, the rotor winding reference frequency may linearly change with the deviation between the actual grid frequency and the nominal grid frequency. Thereby, a simple implementation is provided.

According to an embodiment of the present invention, the rotor winding reference frequency (e.g., $\Omega\_ref$) is set such that a slip (e.g., s) adheres to a predefined value and substantially does not change with changing actual grid frequency at least in a predefined frequency range, wherein the slip s is given by:

$$s=(\Omega(f)-ns(f))/ns(f),$$

wherein f is the actual grid frequency, $\Omega$ is the actual speed of generator at the actual grid frequency f, ns(f) is a synchronous speed at the actual grid frequency f, wherein ns in rpm is given by ns=60*f/p, wherein p is the number of pole pairs of the generator rotor and f is given in Hz.

When the slip substantially does not change with changing actual grid frequency, also the loading of the rotor winding and/or the stator winding may remain substantially constant for changing grid frequencies. Thus, over-dimensioning may be avoided and overheating, or overloading may also be avoided.

According to an embodiment of the present invention, the predefined frequency range is between 0.90 and 1.1, in particular between 0.97 and 1.03, times the nominal grid frequency, wherein for a nominal grid frequency of 50 Hz the predefined frequency range is between 45 Hz and 55 Hz, in particular between 47 Hz and 53 Hz, further in particular between 48 Hz and 52 Hz.

When the predefined frequency range, for example between 0.9 and 1.1 of the nominal grid frequency, is supported, generally expected frequency deviations may be handled. In the predefined frequency range or when the actual grid frequency is within the predefined frequency range, the induction generator may stay connected to the utility grid thereby adhering to particular grid regularities. In particular, the induction generator may stay connected to the utility grid without the risk of overheating or overloading components of the induction generator.

According to an embodiment of the present invention, the rotor winding reference frequency (e.g. $\Omega\_ref$) is set such that a rotor power output by the rotor windings adheres to a predefined relative rotor power and/or stator power output by stator windings adheres to a predefined relative stator power and the rotor power and/or stator power does not change with changing actual grid frequency, at least in the predefined frequency range.

The relative rotor power may for example amount to between 5% and 20% and the relative stator power may for example amount to between 80% and 95% of the total power output by the generator. Other values are possible. The rotor windings and/or converter may be dimensioned to (substantially) support not more than the predefined relative rotor power (and/or current and/or voltage), thereby not requiring over-dimensioning. Thereby costs can be saved and the weight and space requirements of the rotor windings and/or converter may be decreased.

According to an embodiment of the present invention the stator windings are dimensioned according to the predefined relative stator power such that they are required to be operated with a load not higher than 1%, in particular 0.1%, above the predefined relative stator power. Thereby, over-dimensioning and costs may be reduced.

According to an embodiment of the present invention, a converter is connected to the rotor windings for supplying the rotor control signal, wherein the converter in particular comprises an AC-DC converter portion, a DC-link, and a DC-AC converter portion, wherein output terminals of the converter are connected to output terminals of the stator windings.

The AC-DC converter portion as well as the DC-AC converter portion may be implemented by plural controllable power switches, such as IGBT or in general power transistors. Thereby, conventionally available components may be utilized for implementation. When the output terminals of the converter are connected to output terminals of the stator windings (for example three-phase stator windings), the combination of the rotor power and the stator power may be supplied to the utility grid. Furthermore, conventional implementations of a doubly-fed induction generator may thereby be realized. Only the control of the rotor winding by supplying the rotor control signal having the rotor winding reference frequency may be different from conventionally known techniques. However, hardware, i.e., the converter and/or the rotor windings may be as conventionally available.

According to an embodiment of the present invention, the rotor winding and/or a converter connected to the rotor windings are dimensioned according to the predefined relative rotor power such that they are required to be operated with a load not higher than 1%, in particular 0.1%, above the predefined relative rotor power. Due to the control of the rotor windings with the rotor winding reference frequency depending on the actual grid frequency, it may be ensured that the rotor windings and also the converter may not be overloaded or overheated, since due to the adjustment of the rotor winding reference frequency, the load may substantially not change for changing actual grid frequency.

According to an embodiment of the present invention, the rotor winding reference frequency is set as follows:

$$\Omega\_ref(f)=\Omega(f0)*(1+(f-f0)/f0), \text{wherein}$$

f is the actual grid frequency, f0 is the nominal grid frequency, $\Omega(f)$ is the rotor winding reference frequency at the actual grid frequency, $\Omega(f0)$ is the rotor winding reference frequency at the nominal grid frequency, $\Omega(f0)=f0*s$, s is the slip.

Thereby, a very simple formula for implementation of the method may be provided. This definition may guarantee that the slip remains constant and also that the relative rotor power and the relative stator power substantially remain constant also for changing grid frequencies.

According to an embodiment of the present invention, the actual grid frequency is determined as averaging and/or filtering an instantaneous grid frequency over a predetermined time range, in particular spanning between 1 min and 10 min. Thereby, smoothing of the operation of the induction generator may be achieved and it may be avoided that the rotor winding reference frequency changes too rapidly which may cause other operational problems.

According to an embodiment of the present invention, the actual grid frequency deviates from the nominal frequency by less than 5%, or less than 3%, and/or wherein the induction generator includes a, in particular three-phase, doubly-fed induction generator and/or a squirrel cage type generator.

According to an embodiment of the present invention, the induction generator is driven by a rotating shaft of a wind turbine, in particular coupled via a gear box to a main shaft at which plural rotor blades are connected. The gear box may have a transformation ratio such that a typical rotational speed of a main shaft of the wind turbine is converted too roughly the synchronous speed times the slip corresponding to the nominal frequency of the utility grid.

It should be understood that features, individually or in any combination, disclosed, described, explained or provided for a method of controlling an induction generator connected to a utility grid may also be applied, individually or in any combination, to an arrangement for controlling an induction generator connected to a utility grid according to embodiments of the present invention and vice versa.

According to an embodiment of the present invention, it is provided an arrangement for controlling an induction generator connected to a utility grid, the arrangement comprising an input port adapted to receive an actual grid frequency; and a controller adapted to control rotor windings of the generator by a rotor control signal having a rotor winding reference frequency (e.g. $\Omega\_ref$) being set in dependence of the actual grid frequency (e.g. f).

Furthermore, a wind turbine is provided according to an embodiment of the present invention, which includes an induction generator driven by wind energy, the generator having rotor windings and an arrangement according to the precedingly described embodiment.

BRIEF DESCRIPTION

Some of the embodiments will be described in detail, with reference to the following figures, wherein like designations denote like members, wherein:

The FIGURE schematically illustrates a wind turbine according to an embodiment of the present invention.

DETAILED DESCRIPTION

The wind turbine 1 according to an embodiment of the present invention illustrated in the FIGURE includes a doubly-fed induction generator 3. The induction generator 3 is driven by a secondary shaft 5 which is coupled to a gear box 7. The gear box 7 converts a relatively low rotational speed of a main shaft 9 of the wind turbine to a relatively high rotational speed of the secondary shaft 5. At the main shaft 9 plural rotor blades 11 are connected, which are driven by impacting wind 13. A not illustrated nacelle mounted on top of a wind turbine power harbors the generator 3, the shafts 9, 5, the gear box 7 and a converter 17.

The generator 3 comprises stator windings 13 as well as rotor windings 15 both of which are only schematically illustrated. The stator windings 13 may for example comprise three-phase windings or coils which are wound around teeth of a ferromagnetic stator yaw. The rotor windings 15 may also comprise for example three-phase rotor windings wound around ferromagnetic cores.

The three-phase rotor windings 15a, 15b, 15c are connected to a converter 17 comprising an AC-DC converter portion 19, a DC link 21 and a DC-AC converter portion 23. The converter 17 converts AC power into AC power of different frequencies in both directions. The converter 17 is capable of supplying a control signal (for example three-phase signal) 25a, 25b, 25c to the rotor windings 15.

Therefore, the converter 17 receives a driving signal 27 from a controller 30 which, beside the converter 17, may also control other portions of the wind turbine. The controller 30 is part of an arrangement 35 for controlling an induction generator connected to a utility grid according to an embodiment of the present invention. The controller 30 comprises an input port 37 adapted to receive an actual grid frequency signal 39 measured by a speed sensor 41 measuring the rotational speed of the induction generator, namely the rotational speed of the secondary shaft 5 rotating relative to a stator of the generator 3. In order to obtain the frequency signal 39, the generator speed may be filtered or average over particular time ranges for smoothing. The controller 30 is adapted to control the rotor windings 15 by the rotor control signal 25a, 25b, 25c which has a rotor winding reference frequency Ω_ref being set in dependence of an actual grid frequency f.

The output terminals 43a, 43b, 43c of the converter 17 are connected with output terminals 45a, 45b, 45c of the stator windings 13. The stator power P_stator as well as the rotor power P_rotor are connected to a step-up transformer and this is connected to the utility grid 47 where other wind turbines are also connected. The utility grid 47 is intended to be operated at a nominal frequency f0. However, due to disturbances or imbalances between power production and power consumption, the frequency of the utility grid may occasionally deviate from the nominal frequency f0 for example having a value f. In particular, the rotor control signal 25a, 25b, 25c has a rotor winding reference frequency (Ω_ref), which is set in dependence of a deviation (f−f0) between the actual grid frequency f and the nominal grid frequency f0.

The size of the generator 3 as well as that of the converter 17 are designed such that the generator 3 can be operated having a specific slip s (for example 12% according to an embodiment). The reason may be that in a doubly-fed induction generator there is a split of total generator power between the stator power P_stator and rotor power P_rotor. Furthermore, the rotor power P_rotor also effects the size and the rating of the converter 17. For larger generator rotor power P_rotor, the larger the converter 17.

Conventionally, the rotor winding reference frequency may not have been set in dependence of the actual grid frequency. In this conventional case, the relative power contributions from the rotor windings 15 and the stator windings 13 however change depending on the grid frequency. For example, at an actual grid frequency of 47 Hz, the generator rotor power may increase from 620 kW to 950 kW. Accordingly, the converter (e.g., the grid side portion) should be sized to work with this relatively high power so should be over-dimensioned in order to avoid damage during operation. At 50 Hz actual grid frequency, the optimal operating point is reached. However, at 53 Hz actual grid frequency, the generator stator power P_stator increases from 5510 kW to 5860 kW. The generator rotor power P_rotor is reduced from 620 kW to 280 kW, but as the rotor voltage is more reduced (from 270 V to 130 V), finally the currents in the generator rotor are higher and the generators become hotter compared to the design operation point.

For the conventional case, the rotor winding reference frequency was set for 53 Hz actual grid frequency at 1120 rpm resulting in an increase of the stator power P_stator=5860 kW and to a decrease of the rotor power P_rotor=280 kW. Furthermore, the slip was thereby −6%, i.e., not the optimal value for the slip.

According to an embodiment of the present invention, the rotor winding reference frequency, in particular the frequency of the rotor control signal 25a, 25b, 25c is adapted in dependence of the grid frequency variation, in particular in dependence of the deviation of the actual grid frequency from the nominal grid frequency. Thereby, the rotor power as well as the stator power substantially remains constant even for changing actual grid frequencies. In the following Table 1, the effects of different rotor winding reference frequencies for different grid frequencies on the relative power contributions of the rotor and the stator are indicated for grid frequencies of 50 Hz and 53 Hz.

TABLE 1

| f | 50 Hz | f | 53 Hz |
|---|---|---|---|
| ns | 1000 rpm | ns | 1060 rpm |
| Ω_ref | 1120 rpm | Ω_ref | 1180 rpm |
| s | −12% | s | −12% |
| P_stator | 5510 kW | P_stator | 5510 kW |
| P_rotor | 620 kW | P_rotor | 620 kW |
| V_rotor | 270 V | V_rotor | 270 V |
| I_stator | 4610 A | I_stator | 4610 A |
| I_rotor | 1680 A | I_rotor | 1680 A |

For an actual grid frequency of 50 Hz the synchronous speed ns=1000 rpm and the rotor winding reference frequency Ω_ref is set to=1120 rpm. With this setting the stator power is 5510 kW and the rotor power is 620 kW.

For an actual grid frequency of 53 Hz, the synchronous speed is ns=1060 rpm and the rotor winding reference frequency Ω_ref is set=1180 rpm. As can be seen from Table 1, the rotor power P_rotor (Prot) stays at 620 kW and the stator power P_stator (Pst) stays at 5510 kW, thus unchanged relative to the situation at 50 Hz. Furthermore, also the slip s remains for both cases at −12%.

As can also be observed from Table 1, the stator current stays for both frequencies of 50 Hz and 53 Hz at 4610 Ampere and the rotor current stays also for both grid frequencies at 1680 ampere.

Embodiments of the present invention may have the advantage of cost-optimization; avoidance of over-specifications of systems and electrical components secured and increased grid connection capabilities of a wind turbine, avoidance of possible reduction of wind turbine availabilities and others.

According to an embodiment of the present invention, the generator speed may be maintained at the optimum distance from the synchronous speed (ns=60×f/p, with p=number of pole pairs, f=frequency), the thermal sizing of generator and its related converter may be at the optimum. The speed of the generator may be adjusted in dependence of the grid network frequency level but may only be focused in the rated frequency (50 Hz or 60 Hz).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling an induction generator connected to a utility grid, the method comprising:
receiving an actual grid frequency; and
controlling rotor windings of the generator by a rotor control signal having a rotor winding reference frequency (Ω_ref) being set in dependence of the actual grid frequency;
wherein the rotor winding reference frequency (Ω_ref) is set such that a slip (s) adheres to a predefined value and substantially does not change with changing actual grid frequency (f) at least in a predefined frequency range of the actual grid frequency, wherein the slip (s) is given by:

$$s=(\Omega(f)-ns(f))/ns(f),$$

wherein:
- f is the actual grid frequency,
- Ω is the actual speed of generator at the actual grid frequency f,
- ns(f) is a synchronous speed at the actual grid frequency f,
- wherein ns in rpm is given by ns=60*f/p, wherein p is the number of pole pairs of the generator rotor and f is given in Hz.

2. The method according to claim 1,
wherein the utility grid is configured to be operated with a nominal grid frequency,
wherein the rotor winding reference frequency is set in dependence of a deviation between the actual grid frequency and the nominal grid frequency.

3. The method according to claim 1,
wherein the predefined frequency range is between 0.90 and 1.1, or between 0.97 and 1.03 times the nominal grid frequency,
wherein for a nominal grid frequency of 50 Hz the predefined frequency range is between 45 Hz and 55 Hz, in particular between 47 Hz and 53 Hz, or between 48 Hz and 52 Hz.

4. The method according to claim 1,
wherein the rotor winding reference frequency (Ω_ref) is set such that:
a rotor power (Protor) output by the rotor windings adheres to a predefined relative rotor power; and/or
stator power output (Pstator) by stator windings adheres to a predefined relative stator power and the rotor power and/or stator power does not change with changing actual grid frequency, at least in the predefined frequency range.

5. The method according to claim 1,
wherein the stator windings are dimensioned according to the predefined relative stator power such that they are required to be operated with a load not higher than 1%, in or 0.1%, above the predefined relative stator power.

6. The method according to claim 1,
wherein a converter is connected to the rotor windings for supplying the rotor control signal, wherein the converter in particular comprises a AC-DC converter portion, a DC-link, and a DC-AC converter portion,
wherein output terminals of the converter are connected to output terminals of the stator windings.

7. The method according to claim 1,
wherein the rotor windings and/or a converter connected to the rotor windings are dimensioned according to the predefined relative rotor power such that they are required to be operated with a load not higher than 1%, or 0.1%, above the predefined relative rotor power.

8. The method according to claim 1,
wherein the rotor winding reference frequency (Ω_ref) is set as follows:

$$\Omega\_ref(f)=\Omega(f0)*(1+(f-f0)/f0), \text{ wherein}$$

- f is the actual grid frequency,
- f0 is the nominal grid frequency,
- Ω(f) is the rotor winding reference frequency at the actual grid frequency,
- Ω(f0) is the rotor winding reference frequency at the nominal grid frequency,
- Ω(f0)=f0*s,
- s is the slip.

9. The method according to claim 1,
wherein the actual grid frequency is determined as averaging and/or filtering an instantaneous grid frequency over a predetermined time range, or spanning between 1 min and 10 min.

10. The method according to claim 1,
wherein the actual grid frequency deviates from the nominal frequency (f0) by less than 5%, or less than 3%, and/or
wherein the induction generator includes a, in particular three-phase, doubly-fed induction generator and/or a squirrel cage type generator.

11. The method according to claim 1,
wherein the induction generator is driven by a rotating shaft of a wind turbine, in or coupled via a gear box to a main shaft at which plural rotor blades are connected.

12. An arrangement for controlling an induction generator connected to a utility grid, the arrangement comprising:
an input port configured to receive an actual grid frequency; and
a controller configured to control rotor windings of the generator by a rotor control signal having a rotor winding reference frequency (Ω_ref) being set in dependence of the actual grid frequency;
wherein the rotor winding reference frequency (Ω_ref) is set such that a slip (s) adheres to a predefined value and substantially does not change with changing actual grid frequency (f) at least in a predefined frequency range of the actual grid frequency,
wherein the slip (s) is given by:

$$s=(\Omega(f)-ns(f))/ns(f),$$

wherein:
- f is the actual grid frequency,
- Ω is the actual speed of generator at the actual grid frequency f,
- ns(f) is a synchronous speed at the actual grid frequency f,
- wherein ns in rpm is given by ns=60*f/p, wherein p is the number of pole pairs of the generator rotor and f is given in Hz.

13. A wind turbine, including:
an induction generator driven by wind energy, the generator having rotor windings; and
an arrangement according to claim 12.

* * * * *